Figure 1:
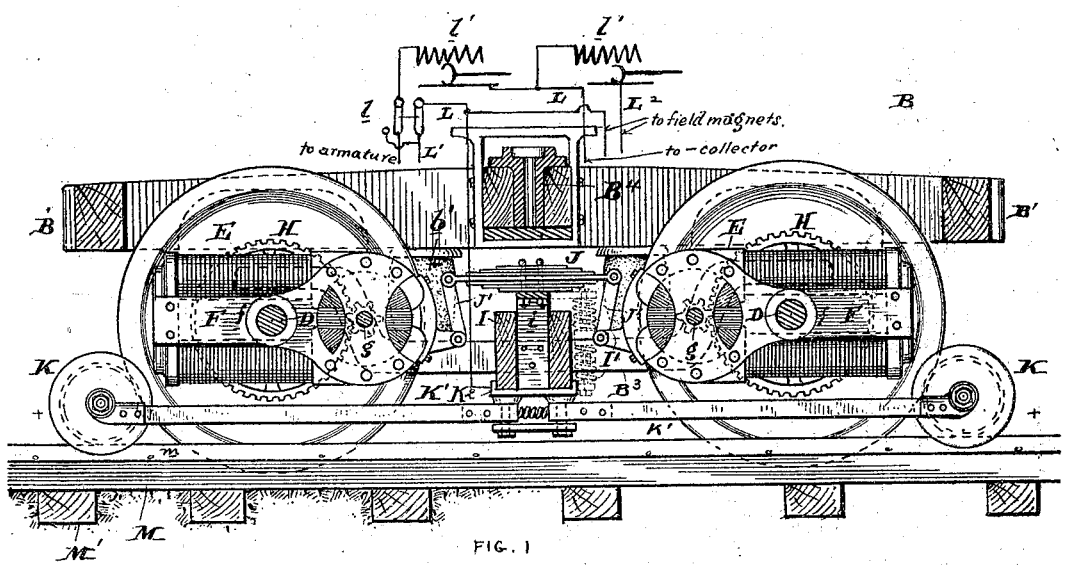

No. 638,966. Patented Dec. 12, 1899.
R. M. HUNTER.
ELECTRICALLY PROPELLED VEHICLE.
(Application filed Oct. 27, 1886.)

(No Model.) 2 Sheets—Sheet 1.

Attest
E. M<sup>c</sup> Dermott
E. M. Breckinreed

Inventor

No. 638,966. Patented Dec. 12, 1899.
R. M. HUNTER.
ELECTRICALLY PROPELLED VEHICLE.
(Application filed Oct. 27, 1886.)
(No Model.) 2 Sheets—Sheet 2.

Attest
E. M. Breckinridge
E. McDermott

Inventor

UNITED STATES PATENT OFFICE.

RUDOLPH M. HUNTER, OF PHILADELPHIA, PENNSYLVANIA, ASSIGNOR TO THE ELECTRIC CAR COMPANY OF AMERICA, OF SAME PLACE.

ELECTRICALLY-PROPELLED VEHICLE.

SPECIFICATION forming part of Letters Patent No. 638,966, dated December 12, 1899.

Application filed October 27, 1886. Serial No. 217,346. (No model.)

*To all whom it may concern:*

Be it known that I, RUDOLPH M. HUNTER, of the city and county of Philadelphia, in the State of Pennsylvania, have invented an Improvement in Electrically-Propelled Vehicles, of which the following is a specification.

My invention has reference to electrically-propelled vehicles; and it consists of certain improvements, which are fully set forth in the following specification and shown in the accompanying drawings, which form a part thereof.

My invention has especial reference to electrically-propelled vehicles, whether they be in a form of pivoted trucks or made integral with the superstructure.

The characteristic features of my invention consist in supporting the motor or motors upon the axle or axles and sustaining them by a frame also carried by the axles, whereby the motors are both geared and journaled to an axle and preferably sustained independently of the car-body. The motor is preferably journaled upon the axle by suitable bearings arranged at considerable distances apart, so as to permit the motors to move more or less about their respective axles as centers, the free ends of the motors being preferably flexibly supported, as hereinafter described.

Referring more particularly to the construction shown, I employ the following arrangement of parts, to wit: To the axle or axles of the vehicle I journal one or more electric motors, which have their journals so located that they are preferably balanced upon said axles. By this means the motor-shaft is allowed to move in an arc about the axle and is connected thereto by suitable gearing or power-transmitting devices. To prevent free rotation of the motor and take up the jar, it is supported by a yielding, flexible, or spring device to the vehicle or truck frame, and this enables the first power of the motor in starting to be expended in putting the spring under tension and provides an elastic connection between the motor and axle, facilitating the starting of the vehicle into motion from a state of rest. I do not limit myself to any particular form of flexible or elastic connection, as the specific constructions are capable of much modification.

Such a connection of motor may be applied to a car or vehicle having axles connected to the car-body, as in the case of ordinary street-cars, or to a car having pivoted trucks, the difference being simply the connection of the car-body with the axles and not modifying the arrangement of the motor with respect to the axles or its method of support.

As shown in this application, I prefer to use two motors, one on each axle and facing each other. The free ends of the motors may be connected to the opposite ends of the same supporting device.

The regulating devices for controlling the current in the motor are preferably arranged upon the car-body and connect with the collectors and motor by wires arranged close to the pivot-point or king-bolt of the truck to prevent excessive torsion or displacement upon the car running upon curves, and thereby insuring durability to the connections. The regulating devices may be controlled from either end of the car and secured, if desired, against the dashers, as shown.

To make the car ride more easily with the increased speed attainable by electricity as the motive power and obviate the necessity of great spring action on the trucks, a feature more or less undesirable, I provide two electrically-propelled trucks connected together by a truss, to the ends of which the trucks are pivoted, and to this truss I pivot the car-body. From this construction it will be observed that either truck may rise and fall or jump and yet induce only a very small vertical vibration to the car-body. With this arrangement the defects of the rapid travel will be greatly eradicated and the motor-trucks will have increased endurance or life and will be less liable to breakage and derangement. As shown, I make the center truck do double duty by connecting it by two separate trusses with the end trucks.

The above are some of the essential features of invention. The others and details will be set out specifically hereinafter.

Figure 2:
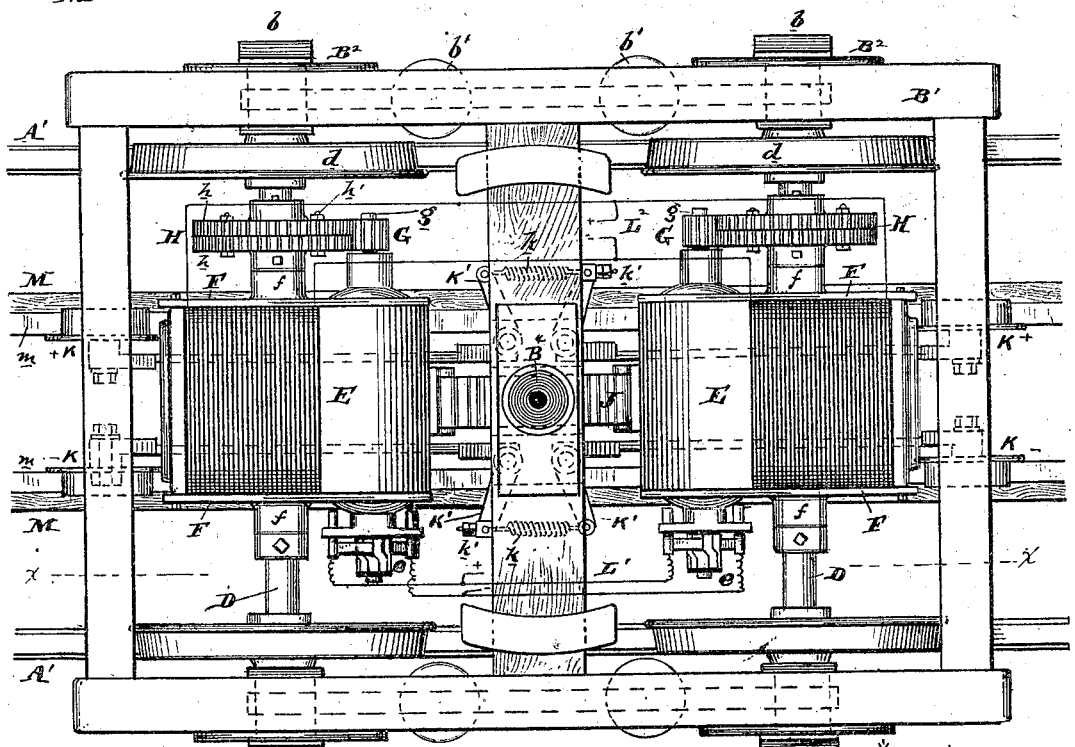
Figure 3:
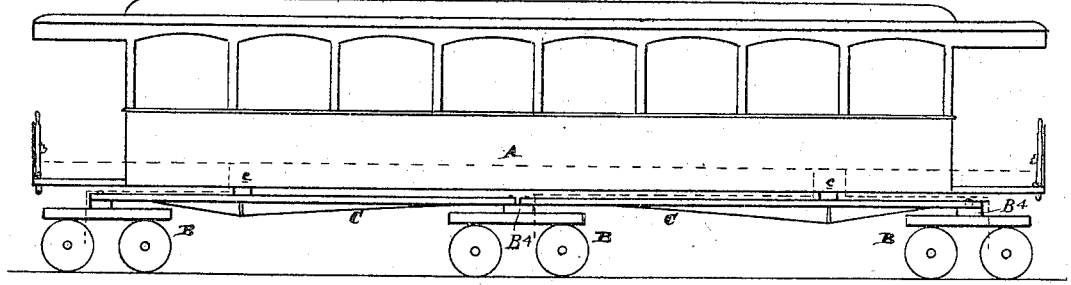
Figure 4:
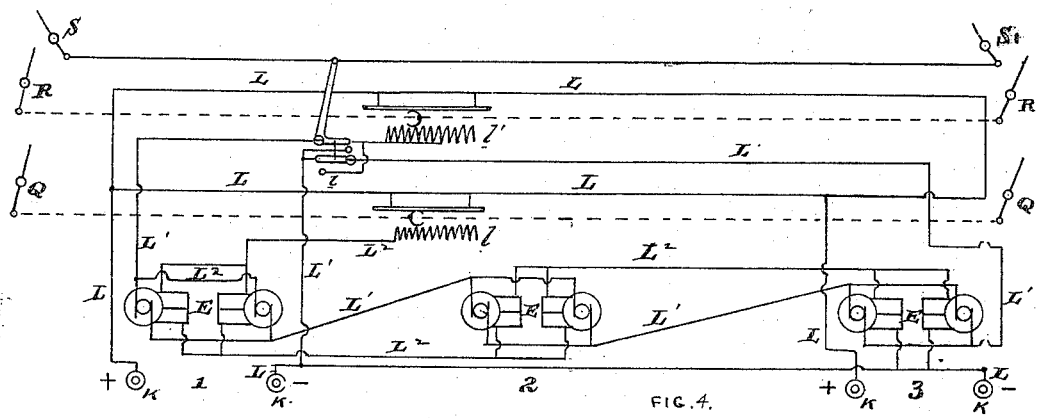

In the drawings, Figure 1 is a sectional elevation of my improved car-truck for an electrically-propelled vehicle, taken on line *x x* of Fig. 2. Fig. 2 is a plan view of same. Fig. 3 is a side elevation of my improved car, showing connection of truck to the car-body; and Fig. 4 is a diagram showing the electrical connections on the car-body and its trucks.

A' are the rails of the railway.

M' represent cross-ties, and M are longitudinal stringers, which may support the line conductors $m$ if line conductors are employed as a source of electrical power.

It is immaterial to my invention in this application what the source of power may be, as the current may be supplied from batteries carried by or moving with the cars or line conductors as desired.

The construction shown in the drawings is such that the car-body of the vehicle may be directly supported upon the frame of the truck and wholly sustained by two axles and four wheels, or the car-body may be pivoted to two trucks constructed substantially as illustrated. In either case what is here shown may be termed a "truck for a car-body." The truck proper may be made in any of the well-known ways. That shown consists of the frame B', provided with the usual side guides $B^2$ for the axle-boxes $b$, in which the axles D are journaled. $d$ are the car-wheels. Supported by the axle-boxes $B^2$, independent of the frame B', are the equalizing-bars or side frames $B^3$, between which and the frame B' are arranged the springs $b'$, which in the construction shown are the only spring devices used between the vehicle frame or body and axles. It is evident that the particular location of these springs $b'$ between the axle-boxes and frame B' is immaterial. By the construction shown I am enabled to have the middle part of the truck free or unobstructed and for the disposal of the electrical connections or apparatus.

$B^4$ is the pivot-plate for connection with the car-body. A truck may be pivoted at each end of the car-body if desired, in which case it would be like any ordinary car having eight wheels. Again, I may consider the frame B' as the vehicle-frame and as a complete vehicle, as it would be if the usual box or body were built upon it, like an ordinary street-car.

E E are the electric motors and have the well-known horseshoe field-magnets. To each side of these magnets and their pole-pieces are secured inclosing brackets or frames F, having journals or bearings $f$, which fit upon the axles D and by which the motors are supported upon the said axles. These bearings or journals are on each side of the motor and considerably separated. The axles may pass between the field-magnets. By this construction the motor-shafts $g$ are caused to remain at a fixed distance from the axles irrespective of the movement of the motor about said axles, and the yokes or keepers of the magnets of the motors are situated parallel with and in close proximity to the driving-axles. To the ends of the motor or drive shafts are secured the pinions G, which preferably have considerable width.

Meshing with these pinions and secured to the axles are spur-wheels H. These spur-wheels are made in two parts $h\ h$ or as if divided through the plane of the wheel, and said parts are secured together by bolts. One of said parts is keyed or otherwise secured to the axle, while the other part is adjustable thereon and bolted to the fixed part at some distance from the axle to make the connection more secure. By adjusting these two parts the teeth thereof may be made to work smoothly between the teeth of the pinion G and all lost motion be taken up. While the above is an excellent connection between motor-shaft and axle, any other well-known form of power connection may be used in place of it. The motor-shafts are provided with the usual commutators and brushes $e$.

To prevent the free revolution of the motors about the axles and take up the jar, I connect them by links $J'$ with the free end of a two-armed spring J, which is carried by a cross bar or frame $i$, secured to the side frames or bars $B^3$. The side frames $B^3$ and the cross-bars $i$ constitute an independent truck-frame carried by the axles and not partaking of all the vertical movements of the spring-supported vehicle-body. For simplicity and to cause the strains on the two ends of the spring J to be in the same direction at the same time the motors are arranged to face each other. This enables the adoption of a cheap and effective construction. It is to be understood, however, that I do not limit myself to any particular elastic or flexible supporting connection for the motor, as my invention comprehends the elastic connection broadly. A coil or other form of spring (shown in dotted lines at $J'$) may be used in place of the flat plate-spring. Now as the motors start up the first tendency to revolution of the armatures will be to oscillate the motors and put the springs J under tension. As the resistance of the springs is gradually increased the tendency to rotate the axle also gradually increases, and by this connection the effective power of the motor on starting is greatly increased. The spring J acts the same when the motor is run forward or backward.

I are cross-frames secured by the frame $i$ or equalizing side bars, or both, and are preferably arranged below the springs J. To these frames I are secured the collector-supporting plates $K^2$, to which the collector-arms $K'$ are loosely hinged, with freedom to movement at their free ends. To the free ends of these arms $K'$ are loosely journaled the collector-wheels K. Any other form of collector may be employed, or the source of power may be batteries carried by or moving with the vehicle. So far as my invention in this application is concerned it is immaterial what source of electrical power may be employed.

As shown in Sheet 1, there are two positive and two negative collector-wheels and arms, and the arms of like polarity are pivoted or hinged to the same plate $K^2$ and may be caused ditions, and the yielding or flexible connection at the free end of the motor to the independent frame structure prevents binding of the motor upon the axle and also prevents any swinging motions of the car-body producing such binding results. The car-body being supported upon springs and guided in the axle-boxes is not subjected to the sudden and severe jar which naturally comes upon the independent frame sustaining the free end of the motor, and hence the comfort of the passengers is not impaired. The independent frame structure supporting the motors is already so low down that excellent provision is made for suspending the free ends of the motors without the necessity of employing other complicated structures or frames connecting with the vehicle-body. As the axle-boxes are independent of the vehicle-body and of the independent or truck frame B³ I i, the latter may conform to the curves of the track and yet at all times sustain the free end of the motor without causing it to bind upon the axle to which it is hinged. By the employment of an independent truck-frame below the car-body or main supporting-frame thereof as the means for sustaining the motor a better distribution of the weight of the motor is obtained than where connected with a part having the vertical motions of the body structure. No twisting of the car-body upon its supporting-springs or of the independent frame upon the axle-boxes can affect the motor so far as its mechanical operation in connection with the axle to which it is hinged and geared is concerned. By keeping the weight of the motor or motors off the vehicle-body and its supporting-springs the body rides more easily and greatly less wear and tear come upon the supporting-springs.

I do not limit myself to any particular details of construction, as they may be modified in various ways without in the least departing from the principles of my invention.

Having now described my invention, what I claim as new, and desire to secure by Letters Patent, is—

1. In an electric railway two working conductors arranged parallel to the track and independent thereof, two or more trucks each provided with an electric motor, and two or more of which are provided with positive and negative collectors independent of the supporting or truck wheels working in contact, with the working conductors, electric circuits common to all of said motors on the different trucks, and receiving current from the various collectors, and a car-body supported upon said trucks.

2. A running-gear for a rapidly-moving electrically-propelled vehicle, consisting of the combination of two pivoted trucks, a truss pivoted to both of said trucks at its ends, and provided at or near its middle with a pivot connection for the car-body, an electric motor supported on each truck independently of the truss and mechanically connected with the axle thereof, and connecting flexible electric circuits between the several electric motors leading to the car-body, and means to control the speed of the motors in said circuit.

3. In an electrically-propelled car, the combination of three trucks linked together, two at least of said trucks having an electric motor hinged upon and adapted to drive an axle and having its free end sustained by the frame of the truck, a car-body supported by said trucks whereby they may shift relatively one to the other to pass around curves, and flexible means leading from the motors to the car-body for controlling the speed of the motors.

4. In an electrically-propelled vehicle the axle, in combination with a motor hinged directly thereto whereby its shaft always remains at a fixed distance from the axle, gearing or equivalent power-transmitting connections between said axle and motor-shaft, a frame carried by the axles and independent of the spring motions of the vehicle-body, a spring carried by said frame, and a connection between the spring and the motor.

5. The combination of a frame joining the axles of a railway-truck and mounted thereon independent of the spring motions of the car-body, with an electric motor having at one end a bearing upon the axle independent of the frame, and a connection to the frame upholding the free end of the motor.

6. The combination of a frame joining the axles of a railway-truck and mounted thereon independent of the spring motions of the car-body, with an electric motor having at one end a bearing upon the axle independent of the frame, and a spring connection to the frame upholding the free end of the motor.

7. The combination of a driven axle of a vehicle, a support sustained by the axles, an electric motor having its field-magnets provided with widely-separated bearings journaled upon one of the axles, and a connection between the motor and the support intermediate of the two axles upholding the free end of the motor independent of the vehicle-body.

8. The combination of a wheeled vehicle, and an electrodynamic motor mounted thereon and propelling the same having its field-magnet provided with parts sleeved at one side of the armature on an axle of the vehicle at widely-separated points, and a flexible or movable support for said field-magnet at its free end.

9. The combination of a wheeled vehicle, and an electrodynamic motor mounted thereon and propelling the same the motor being directly centered at one side of the armature on an axle of the vehicle at two points one on each side of the motor, and a flexible support for said motor at its free end carried by the axles and independent of the vertical motions of the vehicle-body.

10. The combination of a wheeled vehicle having a body supported upon springs, an electrodynamic motor mounted thereon and to move their free ends in the same direction by springs $k$, the tension of which may be regulated by nuts $k'$. Referring to Fig. 2, it will be observed that these arms K' are made like bell-cranks and the short arms are connected by the springs $k$. While two pair of collector-wheels are preferable, yet only one pair need be used, particularly so if the car have two trucks, as then we would have two positive and two negative collectors widely separated to span breaks or divisions and keep a continuous current in the motor-circuits. The collector-wheels are made with flanges and run in contact with the angle-iron conductors, making a rolling contact upon the face of the wheel and a sliding contact upon the flange thereof, thereby greatly increasing the electrical contact. The weight of the wheel and its arm causes the collector to remain upon the conductor, and the spring $k$ causes the flange of the wheel to be pressed against the vertical leg of the angle-iron conductor, insuring good contact and also causing the collector-wheel to follow all lateral irregularities in the conductor.

The cross-bars I and equalizing-bars $B^3$ constitute a frame carried upon the axles, and said frame acts as the support for the springs connecting with the electric motors and is practically at a lower level than the motors and extends transversely across the vehicle below the springs which support the motors.

While this invention is specially designed for railway-cars, it is evident that it equally applies to vehicles of all descriptions whether they are adapted to run upon rails or roads. Hence in using the terms "car" and "car-body" I do not intend to confine myself to any special type of vehicle.

So far as my invention in this application is concerned it is immaterial what source of electrical power may be employed. By employing movable or detachable frames F, by which the motor field-magnets are sleeved to the axle, I am enabled to overcome many of the difficulties which might arise by wearing or breaking of the journals if said journals were integral with the field-magnet castings or forgings, since a defective part may be replaced without removing the parts constituting the motor proper. The construction prevents the motor from straining laterally and reduces the liability of disabling the apparatus in case of accident. The brackets F are preferably arranged and bolted upon the outside of the field-magnets of the motor, and hence are widely separated, and are thereby sleeved upon the axle at points outside the center of the motor. It is evident from the construction herein set out that the motors are supported by the axles and a frame independently of the vehicle-frame and, further, are elastically supported by springs independent of those which support the vehicle-body or its frame. By this it is seen that motors and vehicle-body are independently flexibly supported upon the same truck, so that each may vibrate in accordance with the especial influences which govern it without interfering with the other or being interfered with. It will be observed that the motor structure is such that the interior armature-space of the field-magnets is inclosed or housed in, and the armature therein is thus well protected, the armature-shaft being journaled in the housing at each side of the motor.

I have now described the general construction and will finally refer to Fig. 4, which illustrates the arrangement of motor-circuits on the car shown in Fig. 3. Figs. 1, 2, and 3 correspond to the three trucks. In this connection the collectors on the middle truck have been dispensed with, and the positive and negative collectors on the front and rear trucks, respectively, connected together by the motor-circuits L. L' is the armature-circuit and contains the armature on each truck in multiple-arc connection and the armatures on the different trucks in series. This circuit also contains resistance-changer $l'$ and a current-reverser $l$. The field-magnet coils are also coupled in multiple arc on each truck, but in series on the different trucks, and the field-magnet circuit $L^2$ has a resistance-changer $l''$ or other equivalent means for varying its strength. The resistance-changers and current-reverser are preferably carried on the car-body and are connected by suitable rods or chains with levers Q R S or their equivalent upon either or both platforms of the car, so that in the latter case the car could be controlled from either end. These levers or controllers may be secured to the dashers, as shown in Fig. 3. The motor-circuits are brought to the car-body from the trucks by arranging them close to the pivot-point, as indicated in Fig. 1, so that as little motion as possible shall be given to them when the trucks move, to prevent their derangement and increase their wear. In the construction shown in Fig. 3 the circuits might be brought along the truss close to the car-body at pivot-point $c$, as indicated in dotted lines.

In the construction of electrically-propelled vehicle herein set out it will be observed that the following advantageous results, among others, are secured, namely: The motor being directly hinged to the axle and its free end sustained by a yielding or flexible connection with a frame carried by the axles and separate from the vehicle-body or main frame, no undue vibrations or motions are imparted to the motor by the motions of the body. The elevation of the motor is not changed by the great variations in the loads carried by the body, thus enabling the suspension of the motor to be at the lowest possible position without danger of striking obstructions which are usually found in the streets and which would occur if the motor were lowered with the depressed car-body. The axles being more or less free in their boxes, the hinging of the motor to the axles insures the proper mechanical connection therewith under all conpropelling the same, brackets extending from the field-magnet of said motor on each side and sleeved on an axle of the vehicle, a driving-shaft supported by said brackets, gearing between said driving shaft and axle, and a frame independent of vertical motions of the vehicle-body supported by the axles and sustaining the free end of the motor.

11. The combination of a wheeled vehicle, an electrodynamic motor mounted thereon and propelling the same and centered at one side of the armature on an axle of the vehicle at widely-separated points, a yielding support for said motor at its free end, gear-wheels on said motor and axle between the centering-supports of the motor and the axle-boxes, and a frame separate from the vehicle-body carried by the axles for supporting the free end of the motor arranged outside of the centering-supports of the motor.

12. The combination of a wheeled vehicle, an electrodynamic motor mounted thereon and propelling the same, brackets extending from the field-magnet of the motor on each side and sleeved on an axle of the vehicle, the armature-shaft of the motor supported in bearings on said brackets, and gearing between said armature-shaft and said axle.

13. The combination, with a wheeled vehicle, of an electrodynamic motor mounted upon and propelling the same, the keeper or yoke of the field-magnet of said motor being situated parallel with and in proximity to a driving-axle of said vehicle and provided with two extensions, one on each side, which are sleeved on said axle at points outside the center of the motor.

14. In an electrically-propelled car the combination of the vehicle-body, the axles, an electric motor directly journaled to one of the axles at widely-separated points and having a freely-revolving armature-shaft, single-reduction gearing between the armature-shaft and axle, and a support carried by the axles and located between the two axles and below and separate from the vehicle-body for supporting the free end of the motor.

15. The combination of vehicle-wheels and axles, a frame structure inelastically supported thereon, an electric motor directly journaled upon the axle, an elastic connection between the motor and frame, power-transmitting connections between the motor-shaft and axle, and a vehicle-body supported upon springs and having vertical motions separate from those of the frame structure.

16. In an electrically-propelled vehicle, the axles, in combination with a motor hinged directly thereto whereby its shaft always remains parallel to and at a fixed distance from the axle, gearing or equivalent power-transmitting connections between said axle and motor-shaft, a frame supported upon the axles and not partaking of the motions of the vehicle-body, means loosely connecting the motor with the frame to prevent the motor from rotating freely about the axle, and a vehicle-body supported upon springs and vertically movable relatively to the frame and motor.

17. In an electrically-propelled vehicle, the combination of the axles, a vehicle-body supported upon springs and carried by the axles, a support or frame also carried by the axles separate from and not partaking of all the motions of the vehicle-body, an electric motor having field-magnets and armature one of which parts is rotatable upon a motor-shaft, means for hinging the non-rotatable part of the motor to the axle, power-transmitting connection between the motor-shaft and axle, and a flexible or movable connection between the free end of the motor and support or frame.

18. The combination of the axles and wheels, with a frame supported upon the axles independently of the spring motions of the vehicle-body and consisting of two side bars with a cross-bar, an electric motor directly journaled upon the axle, and a flexible or yielding connection between the motor and the cross-bar.

19. In an electric car the combination of the axles and wheels, a frame structure supported by the axles and having two longitudinal side bars extending from axle-box to axle-box outside the wheels, an electric motor hinged to the axle-box between the wheels of one of the axles, power-transmitting connections between the motor-shaft and axle, a flexible or yielding support between the free end of the motor and the frame structure, a car-body separate and movable vertically independent of the frame structure, and springs supporting the car-body carried directly by the frame structure.

20. In an electric vehicle, the combination of the two axles and their wheels, with an electric motor journaled upon the axle at widely-separated points and having its interior space adjacent to the poles and field-magnets inclosed and constituting a housed space in which the armature revolves, said armature having a shaft journaled in the housing at the sides of the motor, gearing between the armature-shaft and the axle outside of the housings of the motor, and a yielding support carried by both axles connecting with the field-magnets of the motor at the side of the armature farthest from the axle to which it is journaled.

21. In an electric car the combination of the wheels and axles, a spring-supported car-body, two or more motors each hinged to separate axles and respectively geared thereto loose or yielding connections supporting the free ends of the motors against rotation leading to and carried by the axles independently of the car-body whereby the motor does not partake of the vertical motions of the car-body, circuits for supplying current to all of the motors secured to the car-body and flexibly connected with the motors, and means for controlling the current in said circuits and motors arranged on both platforms of the car whereby the car may be operated from either end.

22. In an electric car the combination of the wheels and axles, a spring-supported car-body, two or more motors each hinged to separate axles and respectively geared thereto loose or yielding connections supporting the free ends of the motors against rotation leading to and carried by the axles independently of the car-body whereby the motor does not partake of the vertical motions of the car-body, circuits for supplying current to all of the motors secured to the car-body and flexibly connected with the motors, and means for reversing the current in said motors arranged on both platforms of the car whereby the car may be operated from both ends.

23. In an electric car, the two axles, in combination with separate motors having their field-magnets directly journaled upon the respective axles and having their shafts arranged nearer together and in the spaces between the two axles and parallel to said axles, a frame supported upon the axles and independent of the spring movements of the vehicle-body, power-transmitting gearing between the motor-shafts and the respective axles, flexible or movable connections between the free ends of the motors and the frame supported on the axles, and a vehicle-body sustained upon springs and having no direct connection with the motors and having spring movements independent of the frame sustaining the motors.

24. The combination of two axles and their wheels, with a separate electric motor directly journaled and geared to each axle, a frame extending from axle to axle, independent yielding supports between the motors and frame, and a spring-supported vehicle-body movable independently of the frame.

25. In an electric car, the combination of the axles, a frame carried upon both the axles and separate from the vehicle-body, a vehicle-body supported on springs, an electric motor to rotate the axle and so as to be substantially balanced upon said axle, and a connection between the motor and frame independent of the vehicle-body or its supporting-springs.

26. In an electrically-propelled car, the combination of the wheels and axles, with a car-body supported thereon by springs so as to have free vertical motion independent of the motor, an electric motor arranged below the car-body and independent thereof and having suitable guides or bearings for hinging upon the axle, a power-transmitting connection between the motor and axle to which it is hinged, a yielding support between both of the axles and motor independent of the vertical motions of the car-body, a motor-circuit upon the car and extending to the motor, and a regulator extending to the end of the car-body for controlling the speed of the motor.

In testimony of which invention I hereunto set my hand.

RUDOLPH M. HUNTER.

Witnesses:
 RICHD. S. CHILD, Jr.,
 E. M. BRECKINREED.